US010805437B2

(12) United States Patent
Bosshart et al.

(10) Patent No.: US 10,805,437 B2
(45) Date of Patent: Oct. 13, 2020

(54) COMPILER AND HARDWARE INTERACTIONS TO REMOVE ACTION DEPENDENCIES IN THE DATA PLANE OF A NETWORK FORWARDING ELEMENT

(71) Applicant: Barefoot Networks, Inc., Santa Clara, CA (US)

(72) Inventors: Patrick Bosshart, Plano, TX (US); Michael Gregory Ferrara, Palo Alto, CA (US); Michael E. Attig, Sunnyvale, CA (US); Jay Evan Scott Peterson, San Francisco, CA (US)

(73) Assignee: Barefoot Networks, Inc., Santa Clara, CA (US)

( * ) Notice: Subject to any disclaimer, the term of this patent is extended or adjusted under 35 U.S.C. 154(b) by 0 days.

(21) Appl. No.: 16/383,276

(22) Filed: Apr. 12, 2019

(65) Prior Publication Data
US 2019/0238665 A1    Aug. 1, 2019

Related U.S. Application Data

(63) Continuation of application No. 15/682,365, filed on Aug. 21, 2017, now Pat. No. 10,313,495.
(Continued)

(51) Int. Cl.
| H04L 12/50 | (2006.01) |
| H04L 29/06 | (2006.01) |
| H04L 12/721 | (2013.01) |
| H04L 12/741 | (2013.01) |
| G06F 9/30 | (2018.01) |

(Continued)

(52) U.S. Cl.
CPC ............ *H04L 69/22* (2013.01); *G06F 9/3001* (2013.01); *G06F 9/30029* (2013.01); *H04L 41/0803* (2013.01); *H04L 45/38* (2013.01); *H04L 45/745* (2013.01); *H04L 49/3063* (2013.01); *G06F 7/57* (2013.01)

(58) Field of Classification Search
CPC ............ H04L 12/5689; H04L 12/5696; H04L 12/6418
USPC .......................... 370/386, 388, 389, 400, 422
See application file for complete search history.

(56) References Cited

U.S. PATENT DOCUMENTS

| 6,898,647 B2 | 5/2005 | Duvvuru |
| 7,698,338 B2 | 4/2010 | Hinshaw et al. |

(Continued)

OTHER PUBLICATIONS

Non-Published commonly Owned U.S. Appl. No. 15/682,363, filed Aug. 21, 2017, 39 pages, Barefoot Networks, Inc.
(Continued)

*Primary Examiner* — Dmitry Levitan
(74) *Attorney, Agent, or Firm* — Compass IP Law PC

(57) ABSTRACT

A method of configuring a forwarding element that includes several data plane message processing stages. The method stores a set of action codes in an instruction memory in the data plane of the forwarding element. Each action code identifies an operation to perform on a field of a message received at the data plane. The method determines action codes required to process each field of the message in each message processing stage. The method configures a dataplane processing unit of the forwarding element to concurrently perform a group of the action codes in the same data plane processing stage when (i) the action codes are the same and (ii) operate on the same field of the message.

19 Claims, 12 Drawing Sheets

Related U.S. Application Data

(60) Provisional application No. 62/530,289, filed on Jul. 9, 2017.

(51) Int. Cl.
 H04L 12/24 (2006.01)
 H04L 12/935 (2013.01)
 *G06F 7/57* (2006.01)

(56) References Cited

U.S. PATENT DOCUMENTS

| | | | |
|---|---|---|---|
| 7,984,304 B1 * | 7/2011 | Waldspurger | G06F 21/565 |
| | | | 713/187 |
| 7,990,867 B1 | 8/2011 | Keller et al. | |
| 8,359,466 B2 * | 1/2013 | Liu | H04L 63/0485 |
| | | | 713/160 |
| 8,595,104 B2 | 11/2013 | Parsons et al. | |
| 8,788,512 B2 | 7/2014 | Asaad et al. | |
| 8,964,563 B2 | 2/2015 | Jocha et al. | |
| 9,258,224 B2 | 2/2016 | Bosshart et al. | |
| 9,270,586 B2 | 2/2016 | Assarpour | |
| 9,419,903 B2 | 8/2016 | Kim et al. | |
| 9,825,862 B2 | 11/2017 | Bosshart | |
| 9,826,071 B2 | 11/2017 | Bosshart | |
| 9,847,913 B2 * | 12/2017 | Kanda | H04L 41/0896 |
| 9,912,610 B2 * | 3/2018 | Bosshart | H04L 12/00 |
| 9,912,788 B2 * | 3/2018 | Mahkonen | H04L 12/4633 |
| 9,940,056 B2 * | 4/2018 | Bosshart | G06F 3/0635 |
| 9,948,756 B1 * | 4/2018 | Seshadri | H04L 69/22 |
| 10,009,276 B2 | 6/2018 | Bosshart et al. | |
| 10,313,495 B1 | 6/2019 | Bosshart et al. | |
| 10,523,764 B2 * | 12/2019 | Sivaraman Kaushalram | |
| | | | H04L 67/142 |
| 10,530,691 B2 * | 1/2020 | Yousaf | H04L 47/31 |
| 10,616,101 B1 * | 4/2020 | Peterson | H04L 47/2483 |
| 2002/0124038 A1 | 9/2002 | Saitoh et al. | |
| 2003/0182511 A1 | 9/2003 | Asal et al. | |
| 2006/0200648 A1 | 9/2006 | Falkenberg | |
| 2012/0278615 A1 | 11/2012 | Liu et al. | |
| 2014/0086240 A1 | 3/2014 | Assarpour | |
| 2014/0241359 A1 | 8/2014 | Bosshart et al. | |
| 2014/0244966 A1 | 8/2014 | Bosshart et al. | |
| 2014/0334489 A1 | 11/2014 | Bosshart et al. | |
| 2015/0358219 A1 | 12/2015 | Kanda et al. | |
| 2016/0142315 A1 * | 5/2016 | Tomonaga | H04L 45/7453 |
| | | | 370/392 |
| 2016/0246507 A1 | 8/2016 | Bosshart | |
| 2017/0083334 A1 | 3/2017 | Burger et al. | |
| 2017/0093707 A1 * | 3/2017 | Kim | H04L 69/22 |
| 2017/0134538 A1 | 5/2017 | Mahkonen et al. | |
| 2019/0081894 A1 | 3/2019 | Yousaf et al. | |
| 2019/0238665 A1 | 8/2019 | Bosshart et al. | |

OTHER PUBLICATIONS

Non-Published commonly Owned U.S. Appl. No. 15/682,365, filed Aug. 21, 2017, 39 pages, Barefoot Networks, Inc.

* cited by examiner

COMPILER AND HARDWARE INTERACTIONS TO REMOVE ACTION DEPENDENCIES IN THE DATA PLANE OF A NETWORK FORWARDING ELEMENT

CLAIM OF BENEFIT TO PRIOR APPLICATIONS

This application is a continuation application of U.S. patent application Ser. No. 15/682,365, filed Aug. 21, 2017. U.S. patent application Ser. No. 15/682,365 claims the benefit of U.S. Provisional Patent Application 62/530,289, filed Jul. 9, 2017. The contents of U.S. Provisional Patent Application 62/530,289 and U.S. patent application Ser. No. 15/682,365 are hereby incorporated by reference.

BACKGROUND

Network forwarding elements, such as switches and routers, have control and data plane components. The data plane component includes several message processing stages that handle the forwarding of the data packets that the forwarding element receives. The control plane component provides an interface for configuring the data plane component.

The data plane includes a parser that extracts different fields from the header of received data messages. The extracted header fields are stored in a set of registers (or containers) in a format, which can be modified by successive message processing stages of the forwarding element as part of their message processing operations.

The data plane includes a limited number of packet header containers that can be divided into a set of container fields to store different header fields of a message. The data plane also includes a limited number of arithmetic logic units that are used to perform different actions on the header fields of data messages during different message processing stages. It is desirable to configure the message processing stages of the forwarding elements to optimize the use of the container fields and the arithmetic logic units.

SUMMARY

Some embodiments of the invention provide a physical forwarding element (e.g., a hardware forwarding element such as a switch, a router, etc.) with a data plane message-processing pipeline that reuses container fields for storing header fields of a data message (e.g., a network packet). Some embodiments provide a method that identifies the life span of a first header field of a data message. The life span includes a first message processing stage that starts processing of the first header field and a second message processing stage that is the last message processing stage that processes the first header field.

The data plane of the forwarding element includes several containers (or registers). The containers are divided by a compiler of the control plane into a set of container fields to store different header fields of a message while the message is being processed in the data plane. The method configures a field of a packet header container to store the first header field during the life span of the first header field.

The method then identifies a second header field of the message used in a third message processing stage that is subsequent to the second message processing stage in the message processing pipeline. The method configures a set of hardware circuitries in the data plane to initialize the container field after the end of the second message processing stage and before the start of the third message processing stage. The method then reuses the container field by configuring the container field to store the second header field of the message after the end of the second message processing stage and before the start of the third message processing stage. The third message processing stage then processes the second header field that is stored in the container field.

The method in some embodiments defines a mask that includes several fields where each field of the mask corresponds to a container field. The method utilizes the mask to simultaneously initialize a set of container fields that require to be initialized for reuse. In some embodiments, the hardware circuitry that initializes the container field is a set of combinational logic circuits such as a latch that holds the current value of a container field when the corresponding mask field stores a first value (e.g., all 0's) and resets the container field when the corresponding mask field stores a second value (e.g., all 1's).

The data plane of the forwarding element includes several arithmetic logic units. In some embodiments, the method configures one of the arithmetic logic units of the data plane to initialize the container fields that are being reused. The method in these embodiments configures an ALU to initialize a container field that is being reused in the third message processing stage in a message processing stage that is between the second and third message processing stages of the pipeline.

Some embodiments provide a method of configuring a physical forwarding element that includes several data plane message-processing stages. The method stores a set of action codes in an instruction memory in the data plane of the forwarding element. Each action code identifies an operation to perform on a header field of a message that is received at the data plane. The method determines action codes that are required to process each header field of the message in each message processing stage.

The method configures a data-plane processing unit of the forwarding element to concurrently perform several action codes in the same data plane processing stage and during the same clock cycle when the action codes are the same and operate on the same field of the message. On the other hand, the method configures the data-plane processing unit to perform each of several action codes that operate on the same field of the message in a different processing stage when the action codes are not the same. The data plane of the forwarding element in some embodiments includes circuitry to perform a logical OR operation on the action codes that perform an operation on the same header field in the same message processing stage. Logical OR operation on the actions codes that are the same allows the action codes to be assigned to the same processing unit in the same clock cycle.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a network forwarding element (e.g., a switch, a router, etc.) that has a data plane and a message-processing pipeline that reuses container fields to store different data message header fields during different message-processing stages of the pipeline. The forwarding element includes a compiler that determines whether a container field can be reused. The compiler configures a set of circuitries to reset the content of a container field that stores a header field after the header field is no longer used by the message-processing stages of the pipeline. The compiler then configures the container field to store a new header field for use by subsequent message processing stages of the pipeline.

I. Clearing of Selected Fields in Data Message Header Conatiners

As used in this document, data messages refer to a collection of bits in a particular format sent across a network. One of ordinary skill in the art will recognize that the term data message may be used herein to refer to various formatted collections of bits that may be sent across a network, such as Ethernet frames, IP (Internet protocol) packets, TCP (transmission control protocol) segments, UDP (user datagram protocol) datagrams, etc.

Figure 1:
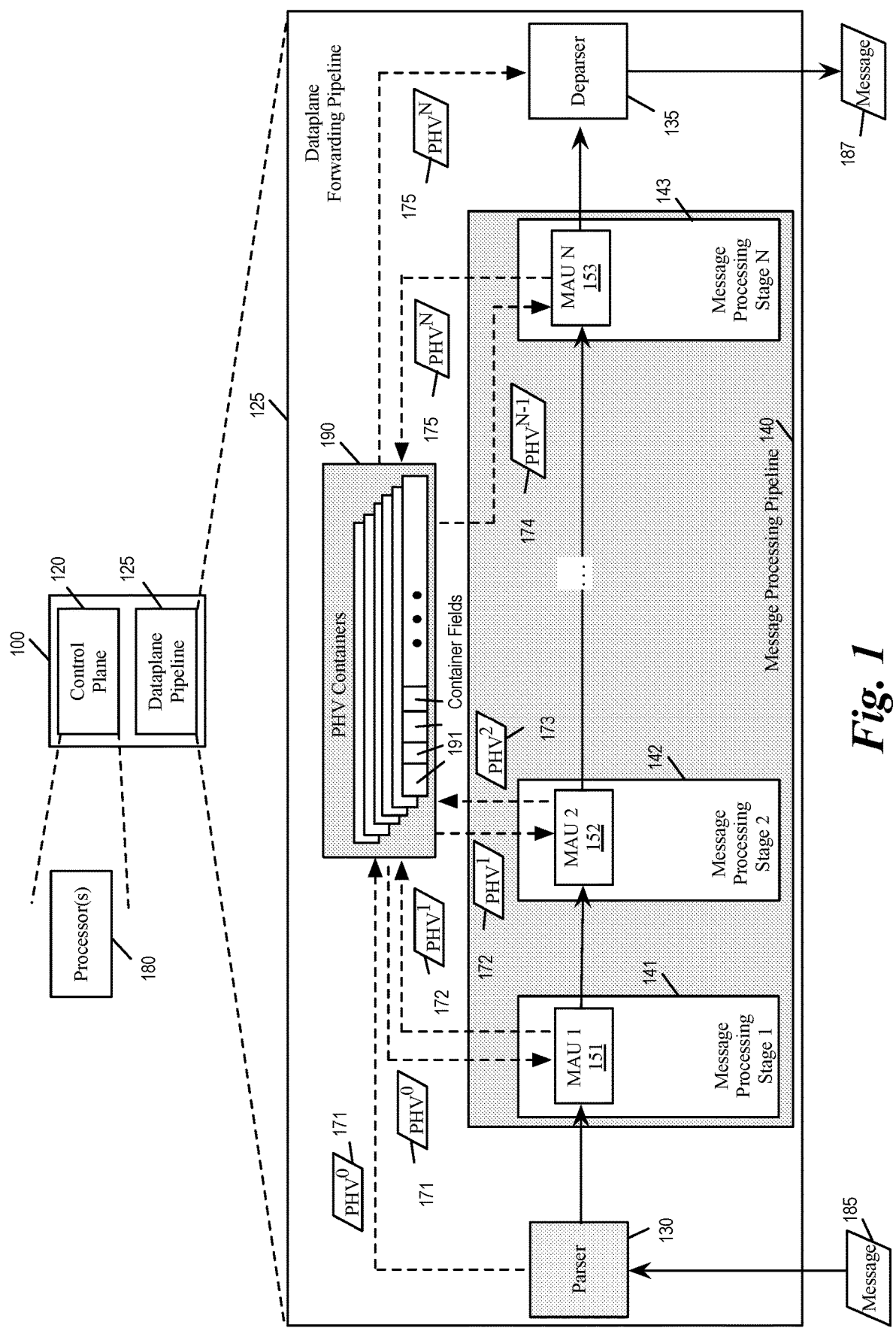
FIG. 1 conceptually illustrates an example of a forwarding element with a message processing pipeline in some embodiments of the invention.

FIG. 1 conceptually illustrates an example of a forwarding element 100 with a message processing pipeline in some embodiments of the invention. As shown, the forwarding element 100 has a data plane 125 and a control plane 120. The data plane 125 includes forwarding circuits (e.g., switching circuits, routing circuits, etc.) for processing and forwarding messages received at the ports of the forwarding element.

The control plane 120 configures the forwarding circuits of the data plane. In some embodiments, the control plane 120 is implemented by a control software layer that is executed by one or more general purpose processors 180 (e.g., CPUs (central processing units)) of the forwarding element, while the data plane 125 is implemented by forwarding circuits that are custom built (e.g., ASICs (application specific integrated circuits)) for performing forwarding operations at very fast line rates.

As shown, the forwarding element of some embodiments includes a parser 130, a deparser 135, and a multi-stage message-processing pipeline 140. Each message-processing stage 141-143 includes a match-action unit (MAU) 151-153. The parser 130 extracts a message header from a received data message 185. In some embodiments, the extracted header is in the format of a packet header vector (PHV), which can be modified by successive message processing stages of the message-processing pipeline 140. In some embodiments, each header vector sequentially passes through several message-processing stages including a set of ingress message-processing stages (or ingress pipeline) and a set of egress message-processing stages (or egress pipeline) that respectively are before and after a traffic manager of the data plane. The traffic manager includes queues that store the data messages (including their associated header vectors) and the network forwarding element's switching fabric that acts as a crossbar switch for directing data messages between the input and output ports of the forwarding element.

The deparser 135 produces the data message header from the PHV of the last message processing stage, and reconstitutes the data message (e.g., combines the header with a payload) when the forwarding element finishes processing the data message and is ready to send this data message 187 to its destination compute node or next forwarding element. The data message 187 that is sent out may or may not be the same as the corresponding data message 185 that the forwarding element receives depending on the processing done on the PHV at different stages 141-143 of the pipeline 140.

In some embodiments, the pipeline is a synchronous pipeline that has its components operate at a minimum clock rate (e.g., at the line rate). Each message-processing stage in some embodiments includes message-forwarding circuitry for processing received data messages for forwarding to data compute nodes and/or to other network forwarding elements.

In some embodiments the PHV includes a set of different size registers or containers 190. For instance, in some embodiments the PHV includes sixty-four 8-bit registers, ninety-six 16-bit registers, and sixty-four 32-bit registers (for a total of 224 registers containing 4096 bits). Other embodiments may have any different numbers of registers of different sizes. In some embodiments, the parser 130 stores each extracted packet header in a particular subset of one or more registers of the PHV. For example, the parser might store a first header field in one 16-bit register and a second header field in a combination of an 8-bit register and a 32-bit register (e.g., if the header field is 36 bits long).

The parser might also divide a register into several fields 191 and use each field to store a different header field. In addition to storing header fields, the registers might be used by the message-processing pipeline to store different variables or flags. For example, a 1-bit field of a register might be used to store a flag to indicate that the data message being processed has to be dropped. Other bits of the same register might be divided into one or more bits to store other variables or to store different packet header fields.

The parser identifies various fields of the packet header and extracts the corresponding fields' data to create the PHV. As shown, the parser stores the initial PHV (PHV⁰ 171) in the set of PHV containers 190. As shown, each message processing stage 141-143 receives an input PHV 171-174, processes the PHV, and sends out (either to the next stage or to the deparser 135 if the stage is the last stage in the pipeline) an output PHV 172-175, which becomes the input PHV of the next stage (or the deparser). Each message processing stage may change the PHV by changing one or more fields of the PHV or may send out the PHV unchanged. Each PHV at the end of a message processing stage may include data message header fields as well as metadata that is inserted by the data processing stage according to its programming.

Figure 2:
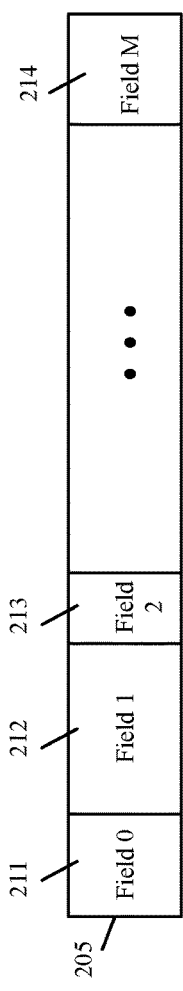
FIG. 2 conceptually illustrates a PHV container in some embodiments.

FIG. 2 conceptually illustrates a PHV container in some embodiments. As shown, the parser has divided the container 205 into several fields 211-214. The parser might divide a container into as many fields as needed to store different fields of a data message header. Different containers may be divided into different fields. For instance, another container with the same number of bits might be divided by the parser into the same fields 211-214, different number of fields, or fields with different sizes. The parser might also not divide a container into different fields and use the container as one field. The container may also be used in combination with one or more other containers to store a message header field that is larger than the size of the container.

Since the number of available bits in the PHV containers is limited (e.g., 4096 bits), it is desirable to reuse the fields when a packet header field or the variable stored in a field is no longer needed in the message processing pipeline. For instance, if field 212 is used to store a data message header fields to be processed by message-processing stages 1 to 5, it is desirable to reuse the container field 212 to store another header field or a variable to be processed by one or more message processing stages after stage 5.

In order to determine whether or not a container field can be reused, some embodiments determine the life span of each data message header field. Once the last message processing stage that uses or processes a particular packet header field (or a particular variable) is determined, the container field that is used to store the data message header field can be reused to store another value to be used or processed by another message processing stage that is after the particular message processing stage.

Figure 3:
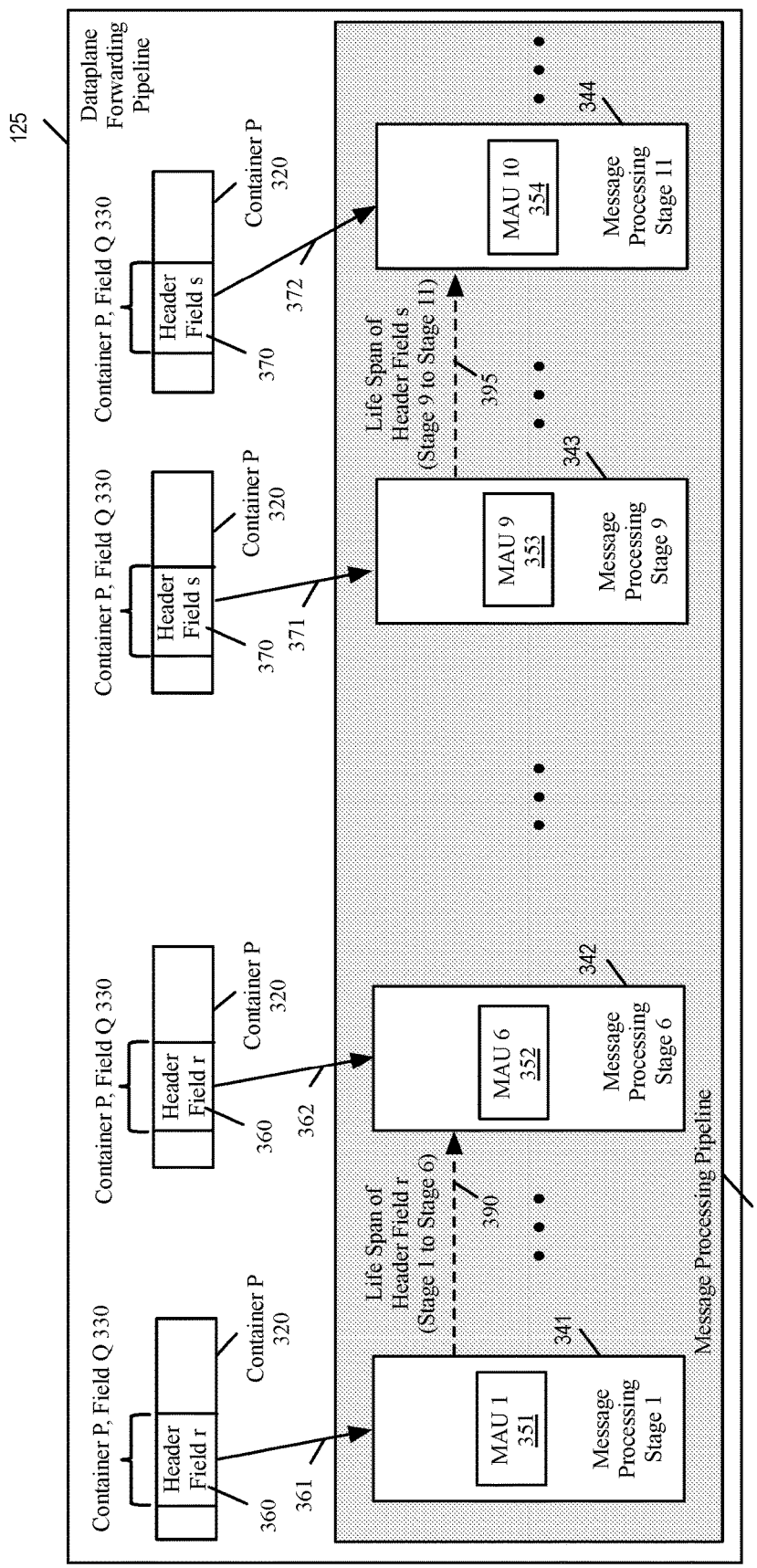
FIG. 3 conceptually illustrates an example of a container field that can be reused in the message processing pipeline of a forwarding element in some embodiments.

FIG. 3 conceptually illustrates an example of a container field that can be reused in the message processing pipeline of a forwarding element in some embodiments. As shown, container P 320 includes a field Q 330. Field Q 330 is used to store data message header field r 360 to be used by message processing stage 1 341 to message processing stage 6 342.

In some embodiments, a compiler uses a set of flow graphs to generate parser and MAU configuration data. The compiler also uses the flow graphs to determine the life span of each header field (or the other data used by the message processing stages). When a header field is no longer needed by the message processing stages in the pipeline, the container field that is used for storing the header field can be reused to store another header field for processing by subsequent message processing stages in the pipeline.

Figure 4:
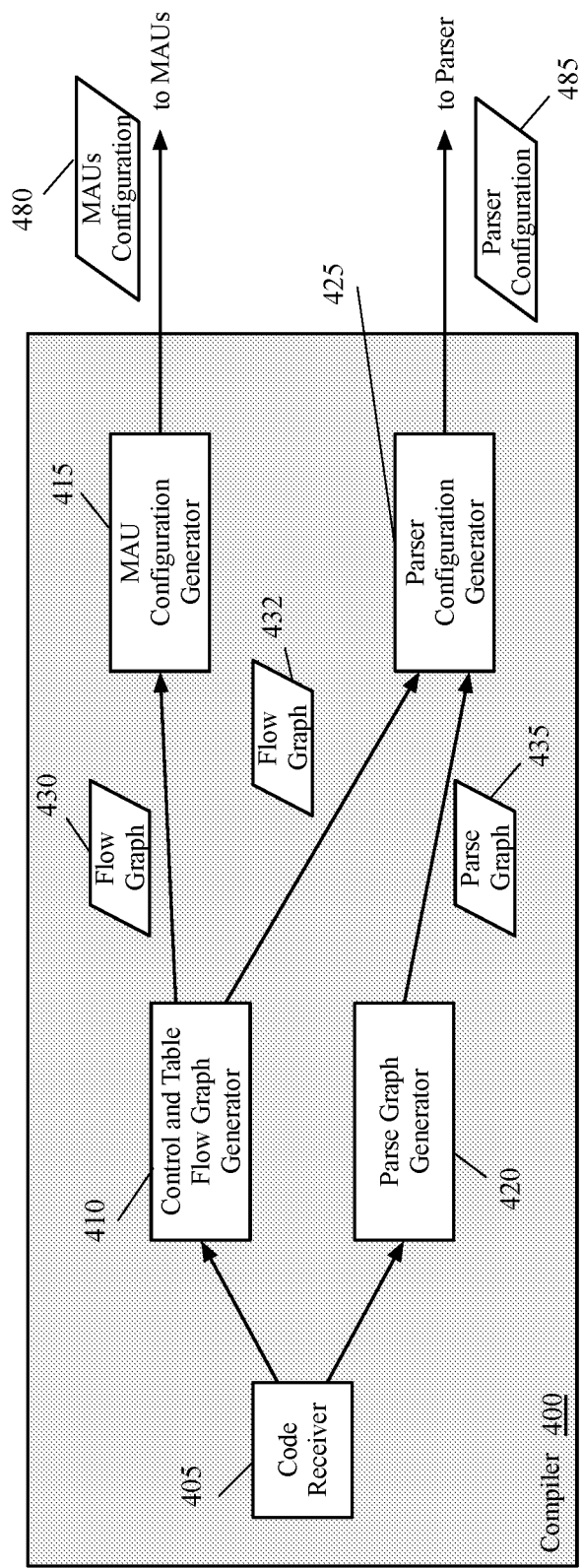
FIG. 4 conceptually illustrates a compiler of some embodiments for generating parser and MAU configuration data.

FIG. 4 conceptually illustrates a compiler 400 of some embodiments for generating parser and MAU configuration data. As shown, the compiler includes a code receiver 405, control and table flow graph generator 410, MAU configuration generator 415, parse graph generator 420, and parser configuration generator 425. The code receiver 405 receives code defining the forwarding element operations (e.g., as written by a switch designer, network administrator, etc.), and passes this code to the graph generators 410 and 420 (possibly after translating the code into a different format if needed). In some embodiments, the code is received as P4 code. P4 is a domain-specific programming language, which is used for programming protocol-independent packet processors. P4 language works in conjunction with protocols such as OpenFlow and is designed to program the match-action tables of the forwarding element.

The control and table flow graph generator 410 uses the received code to generate the possible flows through a set of match and action-tables that the switch will implement. In some embodiments, the flow graph(s) may be linear or branched, depending on the nature of the code received by the compiler. As shown in the figure, the flow graph generator 410 outputs a flow graph 430, which includes numerous match-action stages. Each match-action stage includes a set of match entries that specify one or more packet header fields (or other data that is not actually part of the packet header, such as ingress or egress ports) over which packets will be matched, as well as corresponding action entries that specify actions to take when a packet matches the associated match entry. These actions may include modifying certain packet header fields, in addition to other actions (e.g., dropping the packet, modifying non-header field data about the packet). The MAU configuration generator 415 uses the control and table flow graphs to generate the MAU configuration entries 480, in some embodiments.

The parse graph generator 420 of some embodiments uses the received code to generate a parse graph specifying the possible paths that a parser can take to parse a received packet. Though shown here as generated from the code, in some embodiments the parse graph is information stored with the compiler, which specifies how to parse any packet. In other embodiments, some of the information (how any packet might be parsed) is stored with the compiler, but a parse graph for the particular switch is generated based on information in the code that indicates what types of packets may actually be processed by the switch (e.g., if all packets will only have Ethernet as the layer 2 protocol). As shown, the parse graph generator 420 outputs a parse graph 435. The parser configuration generator 425 uses the parse graph 435 as well as the control and table flow graphs 430 to generate configuration data 485 used to configure the parser in the hardware switch pipeline.

The compiler also uses the flow graphs 430 to determine the life span of each header field (or the other data used by the message processing stages). In the example of FIG. 3, the compiler determines that the data message header field r 360 has a life span that extends (as conceptually shown by 390) from message processing stage 1 341 to message processing stage 6 342. As shown by 361 and 362, container P, field Q 330 is used by MAUs 351 to 352 between message processing stages 341 and 342 to store packet field r 360.

In the example of FIG. 3, since header field r 360 is no longer needed after stage 6 342, the compiler has reused container P, field Q 330 to store another header field, namely header field s 370 in stage 9 343. Similar to header field r, the compiler uses the flow graphs and determines that the life span of header field s 370 is (as conceptually shown by 395) between stage 9 343 and stage 10 344. As shown by 371 and 372, container P, field Q 330 is used by MAUs 353 to 354 between message processing stages 343 and 344 to store packet field s 370. Container P, field Q can, therefore, be used after stage 11 344 to yet store another header field (or another variable) for use by message processing stages after stage 11 344.

Figure 5:
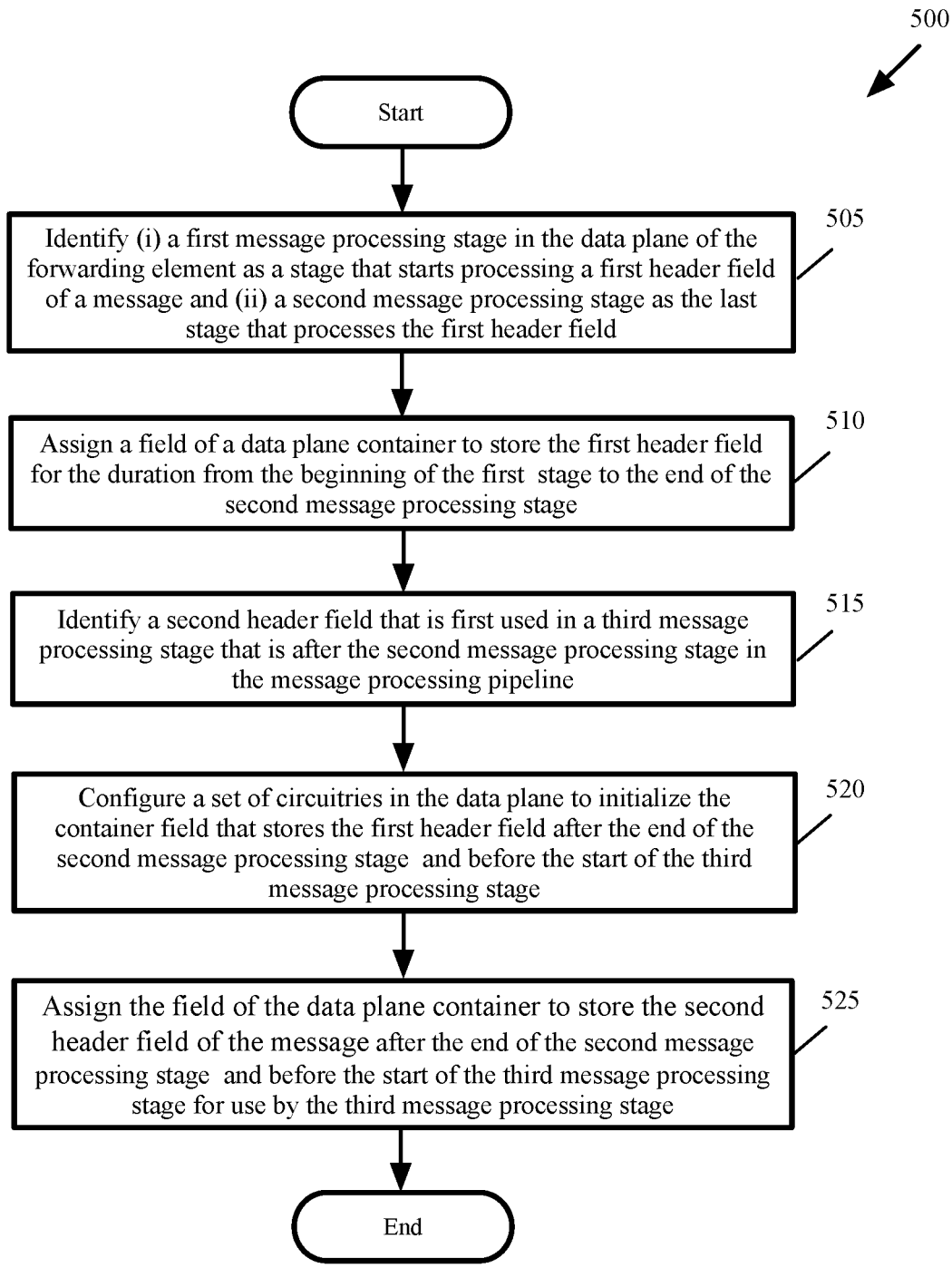
FIG. 5 conceptually illustrates a process for reusing PHV container fields in some embodiments.

FIG. 5 conceptually illustrates a process 500 for reusing PHV container fields in some embodiments. The process in some embodiments is performed by a compiler such as compiler 400 in FIG. 4. The process, at 505 identifies (i) a first message processing stage in the data plane of the forwarding element as a stage that starts processing a first header field of a message and (ii) a second message processing stage as the last stage that processes the first header field. For instance, the process determines that header field r 360 is only used between message processing stages 1 to 6 as shown in FIG. 3.

The process then assigns (at 510) a field of a data plane container to store the first header field for the duration starting from the beginning of the first stage to the end of the second message processing stage. For instance, the process assigns field Q 330 of container 320 to store header field r 360 for the duration of stages 341-342.

The process then identifies (at 515) a second header field that is first used in a third message processing stage that is after the second message processing stage in the message processing pipeline. For instance, the process identifies header field s 370 as a header field that starts being used at message processing stage 343, which is after message processing stage 342.

The process then configures (at 520) a set of circuitries in the data plane to initialize the container field that stores the first header field after the end of the second message processing stage and before the start of the third message processing stage. One issue with reusing a container field such as field 330 that is storing a header field (such as header field 360) to store another header field (such as 370) is to initialize the container field prior to storing the new value.

As described further below, some embodiments configure one of the message processing stages to initialize a container field for reuse by subsequent stages. Other embodiments avoid using one of the message processing stages for the initialization and instead configure a set of specialized circuitry to initialize container fields for reuse by the subsequent stages. It should be understood that the container field is initialized only if it is needed to store another header field for use by a subsequent message processing stage. Otherwise, the container field is not initialized.

The process then assigns (at 525) the field of the data plane container to store the second header field of the message after the end of the second message processing stage and before the start of the third message processing stage for use by the third message processing stage. For instance, the process assigns container field 330 to store header field 370 after the end of stage 342 and before the start of stage 343. The process then ends.

A. Resetting Container Fields by Using a Message Processing Stage

Figure 6:
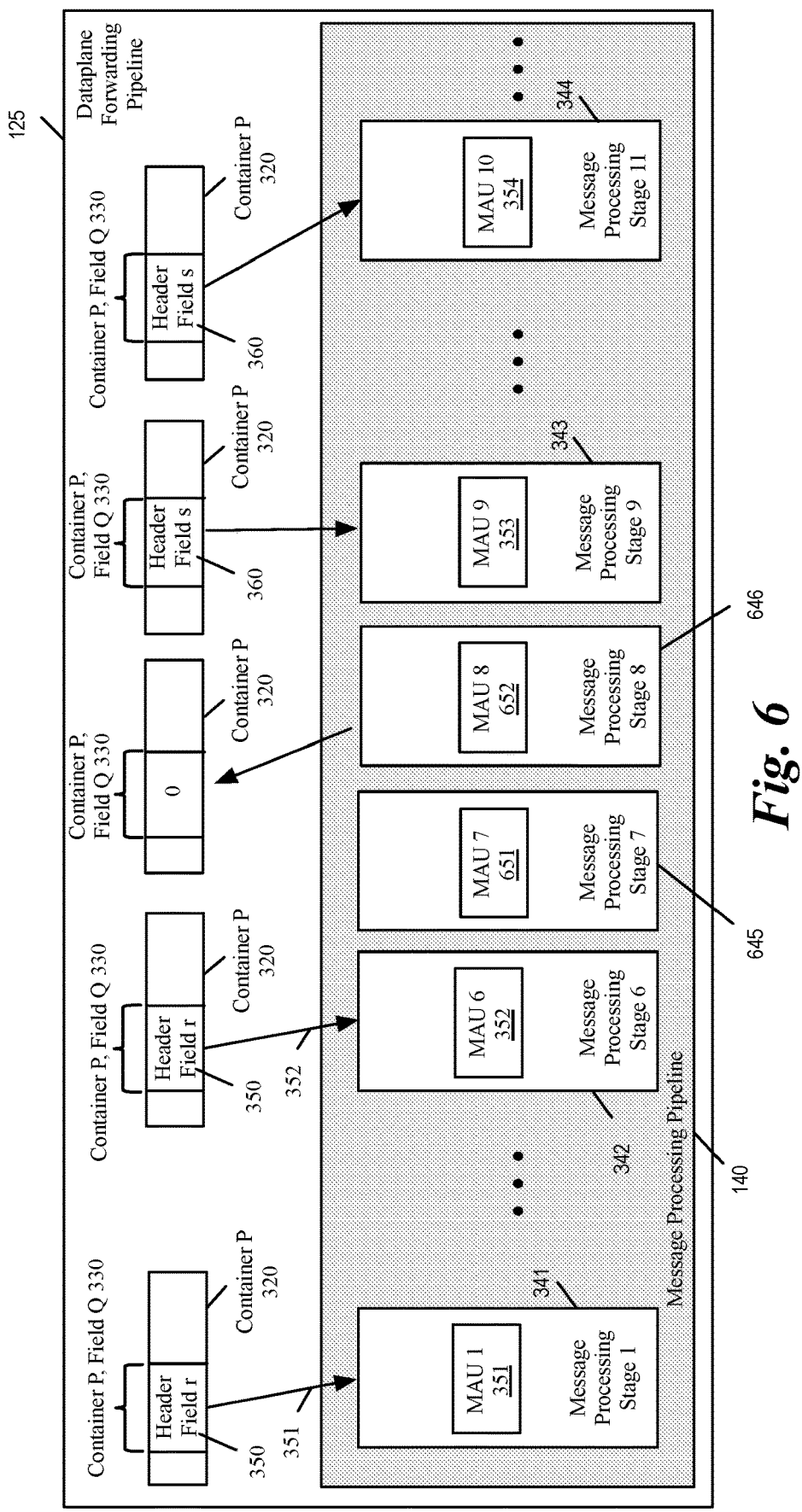
FIG. 6 conceptually illustrates initialization of a container field by the MAU of a message processing stage in some embodiments.

FIG. 6 conceptually illustrates a message processing pipeline that initializes container fields by the MAU of a message processing stage in some embodiments. The figure shows the example of FIG. 3 where header field 360 is no longer needed after message processing stage 342 and container P, field Q 330 that stores header field r 360 can be repurposed to store another value such as header field s 370 for use by a one or more subsequent message processing stage such as stage 343 to 344.

In the example of FIG. 6, the compiler (shown in FIG. 4) has identified message processing stage 8 as a message processing stage that is (i) between the last stage 342 that uses header field r 350 and the first stage 343 that uses header field s 360 and (ii) is available (i.e., is not assigned by the compiler to perform any other match and action operations) for being used to initialize the container field 330.

As shown, MAU 652 in stage 8 646 is configured to initialize container field 330 (e.g., to set the value to 0). Each MAU in some embodiments comprises an arithmetic logic unit (ALU). The compiler makes the decision to configure the ALU of which one of the MAUs 651-652 to initialize the container field 330 is based on the availability of the MAUs and timing optimization of the pipeline. It should be understood that the same message processing stage can be used to initialize several container field (of the same or different containers) if all those container fields (i) were used to store header fields that are no longer used and (ii) are assigned by the compiler to store other header fields for use in subsequent message processing stages.

The initialization technique shown in FIG. 6 has the drawback of requiring one of the MAU stages of the pipeline to initialize the container field. Considering that many different container fields may become available at different stage of the pipeline, using a message processing stage to initialize the container fields requires a compromise between reusing the container fields and dedicating one or more message processing stages for initialization.

B. Resetting Container Fields by Using Specialized Hardware Circuitry

Figure 7:
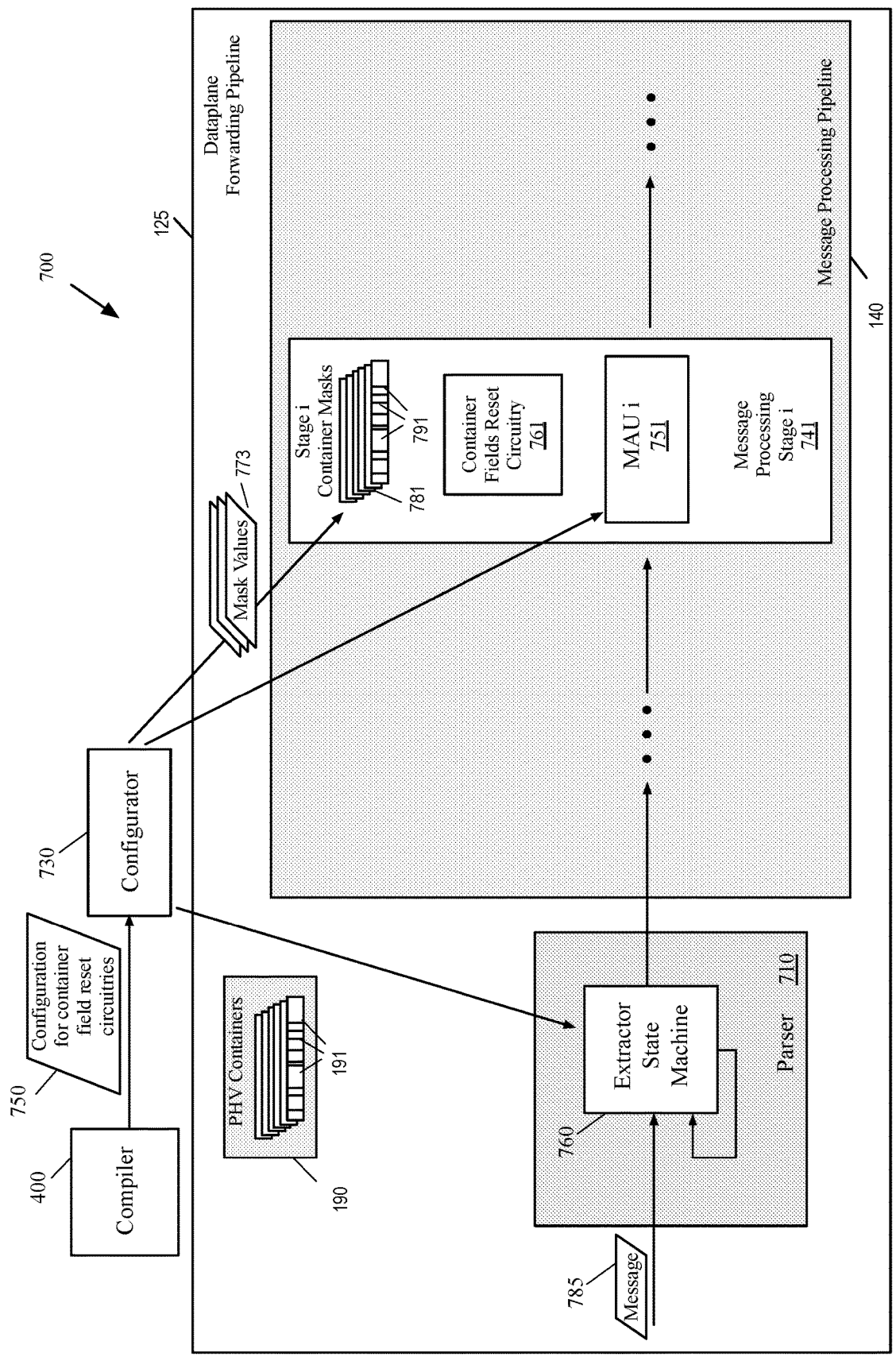
FIG. 7 conceptually illustrates a message processing pipeline of some embodiments that initializes container fields by using specialized hardware circuitry without using a processing stage for the initialization.

FIG. 7 conceptually illustrates a message processing pipeline of some embodiments that initializes container fields by using specialized hardware circuitry without using a processing stage for the initialization. The figure shows a parser 710, a compiler 400, a configurator 730, and a message processing pipeline 140 that includes several message processing stages, one of which (message processing stage 741) is shown.

Each message processing stage 741 has an MAU 751, circuitry 761 for resetting container fields, and a set of container masks 781. The parser 710 of some embodiments includes an extractor state machine 760. In some embodiments, the parser 710 and the message processing pipeline 140 are part of a chip that includes the hardware circuitry for the data plane of the forwarding element. The compiler 400 and configurator 730, on the other hand, are control plane components of the forwarding element and are not part of the chip.

The configurator 730, in some embodiments, represents a runtime network controller stack that configures the forwarding element, while the compiler 400 operates at an earlier stage to generate the configuration data (e.g., MAU configuration data 480 and Parser configuration data 485 shown in FIG. 4) and provide this configuration data to the configurator 730.

In some embodiments, the compiler 400 generates configuration data for the hardware switch based on a switch configuration received by the compiler (e.g., through code written by a user, such as P4 code for designing switch operations). The configuration data specifies how to program the match-action stages of the MAUs 751 to implement the forwarding element configuration specified by the received configuration code, as well as how to program the extractor state machine 760 of the parser to extract the packet header fields correctly and to place the packet header fields into the appropriate PHV containers.

The compiler 400 passes the configuration data to the configurator 730, which provides the configuration data to the MAUs 751 so that the MAUs can implement the appropriate switch configuration. In addition, the configurator 730 provides the parser configuration data generated by the compiler 400 to the extractor state machine 760 so that the extractor state machine can extract header fields from the packets into the PHV containers 190.

As shown, the compiler 400 also passes configuration data 750 for container field reset circuitries in each stage to the configurator 730, which provides the configuration data to the container fields reset circuitry 761 in each stage so that the container fields reset circuitry 761 can reset the container fields that are identified by the compiler. The configuration data includes a set of mask values 781. The mask values might be different for each stage depending on which container fields have to be reset.

Each container mask in the set of container masks corresponds to a container in the set of PHV containers 190. The size of each container mask corresponds to the size of the corresponding container. The fields 791 in each mask also correspond to the fields 191 of the corresponding container. The masks are used to determine which field of each container has to be initialized in each stage. For instance, a value of all 1's in a field might indicate that the field has to be reset in that stage while a value of all 0's in a field might indicate that the field does not need to be reset in that stage.

Figure 8:
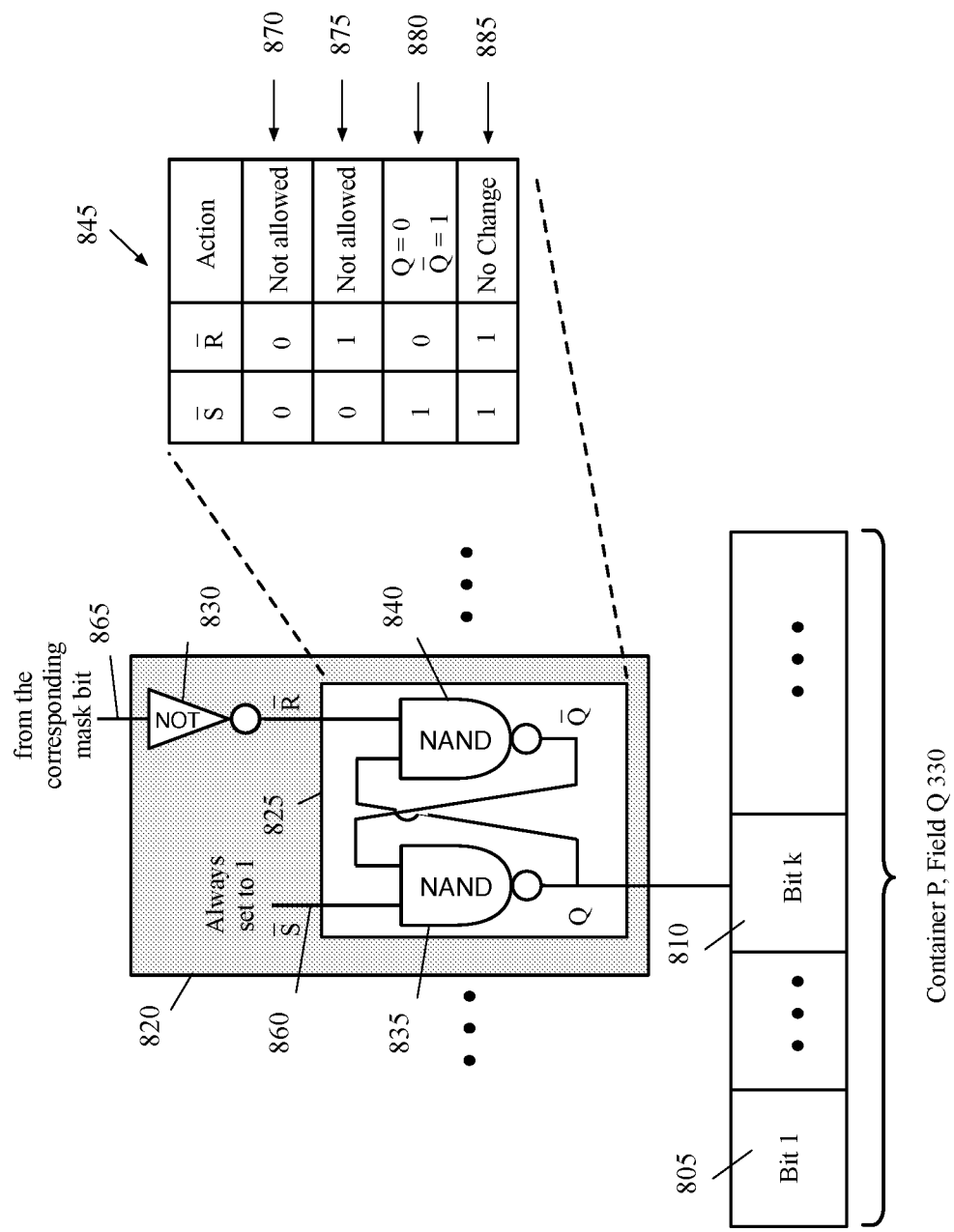
FIG. 8 conceptually illustrates an example of a portion of the container fields reset circuitry of a message processing stage of some embodiments.

FIG. 8 conceptually illustrates an example of a portion of the container fields reset circuitry of a message processing stage of some embodiments. The figure shows a container field 330 such as field Q of container P shown in FIG. 3. In this example, the container field has several bits 805-810, although a container field can have only one bits. Also, in this example, a mask value of all 1's in the mask field that corresponds to container field 330 indicates that the container bits has to be reset, while a value of all 0's indicates that the value stored in the container field should not change.

The figure also shows an exemplary combinational circuit 820 to reset one of the container field's bits (bit K 810). A similar circuit might be used to reset other bits of the container field. As shown, the circuit 820 includes an S-R flip-flop 825 that acts as a latch and a NOT gate 830. The S-R flip-flop includes two NAND gates 835 and 840. The input 860 of the flip-flop 840 is always set to 1. The input 865 is connected to the mask bit that corresponds to container bit 810.

The truth table for the S-R flip-flop is shown in table 845. Since input 860 is set to one, the two rows 870 and 875 of truth table 845 never occur. When input 865 (i.e., the mask bit) is 1, the output of the NOT gate 830 is 0, and the flip-flop operates according to row 880, which sets output Q to 0. As a result bit K 810 is set to 0.

On the other hand, when the input 865 (i.e., the mask bit) is 0, the output of the NOT gate 830 is 1, and the flip-flop operates according to row 885, which makes no change to the outputs of the flip-flop. In other words, the flip-flop acts as a latch and holds its output Q at the same value (either 0 or 1). As a result, the value of bit K 810 would not change.

In some embodiments, the same operation happens for all bits in all fields of all containers at the same time. The bits that correspond to a mask value of 1 are set to 0 and the bits that correspond to a mask value of 0 are left unchanged. It should be understood that circuit 820 is just an example of a circuit that can be used to reset the bits of the container fields according to the value of a mask.

Figure 9:
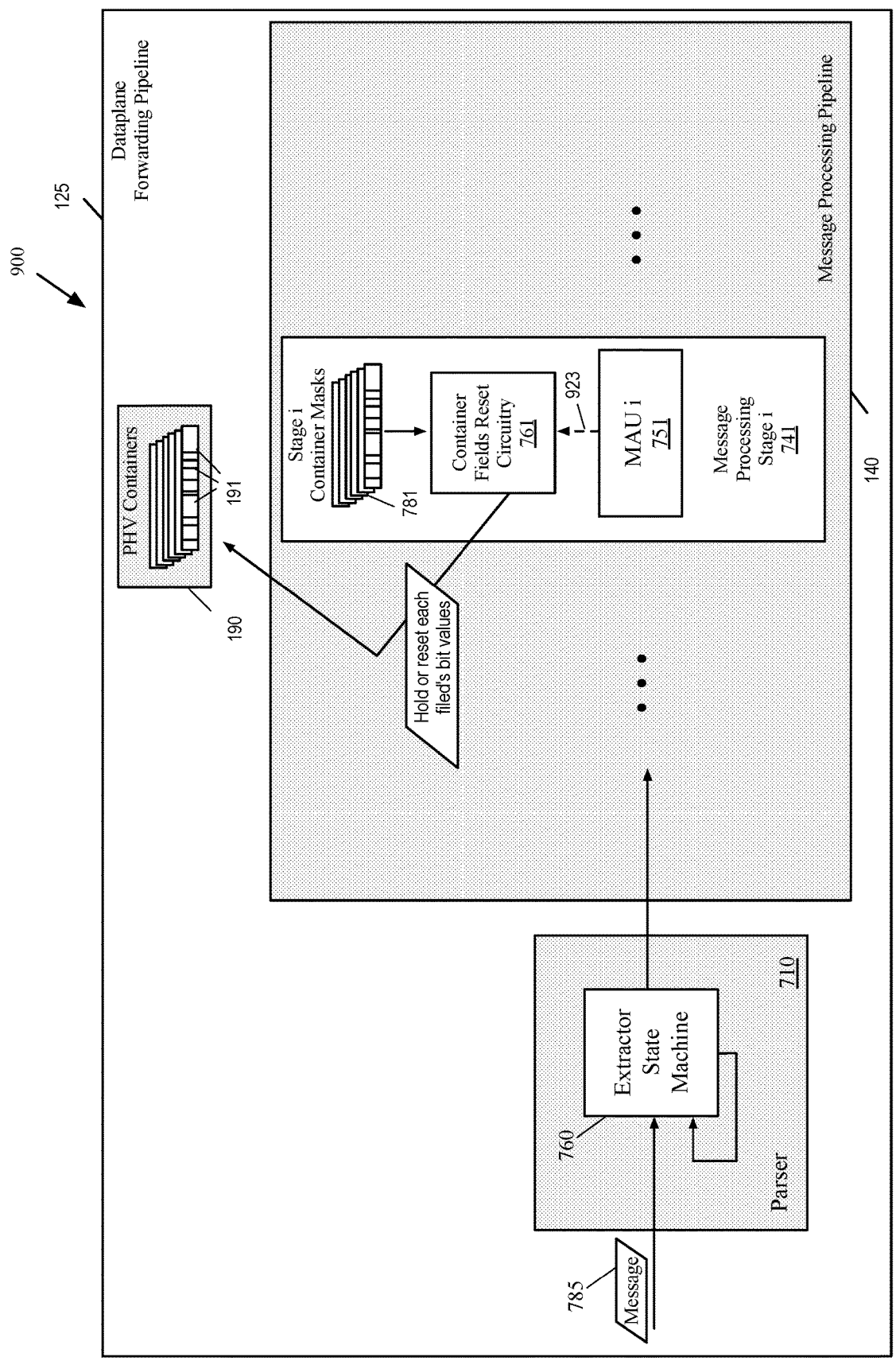
FIG. 9 conceptually illustrates the message processing pipeline of FIG. 7 during possessing of data message header fields in some embodiments.

FIG. 9 conceptually illustrates the message processing pipeline of FIG. 7 during possessing of data message header fields in some embodiments. As shown, the container fields reset circuitry 761 receives a signal 923 from the MAU 751 to initialize the PHV containers 190 fields 191. The container fields reset circuitry 761 uses the container masks 781 of the processing stage to either hold or reset the bits of each field 191 of the PHV containers 190 as described above by reference to FIG. 8.

II. Removing Action Dependencies Using ALU Instruction Addresses

In some embodiments, the packet-processing pipeline is a network switch that modifies and switches packets, as well as collects information on packets, ports, etc., for the purpose of managing the switch and the network. In such a pipeline, packets are matched against a set of rules, and matching rules have corresponding actions that can transform or route the packet. In some embodiment, the match-action operations of the switch are defined by OpenFlow protocol.

Figure 10:
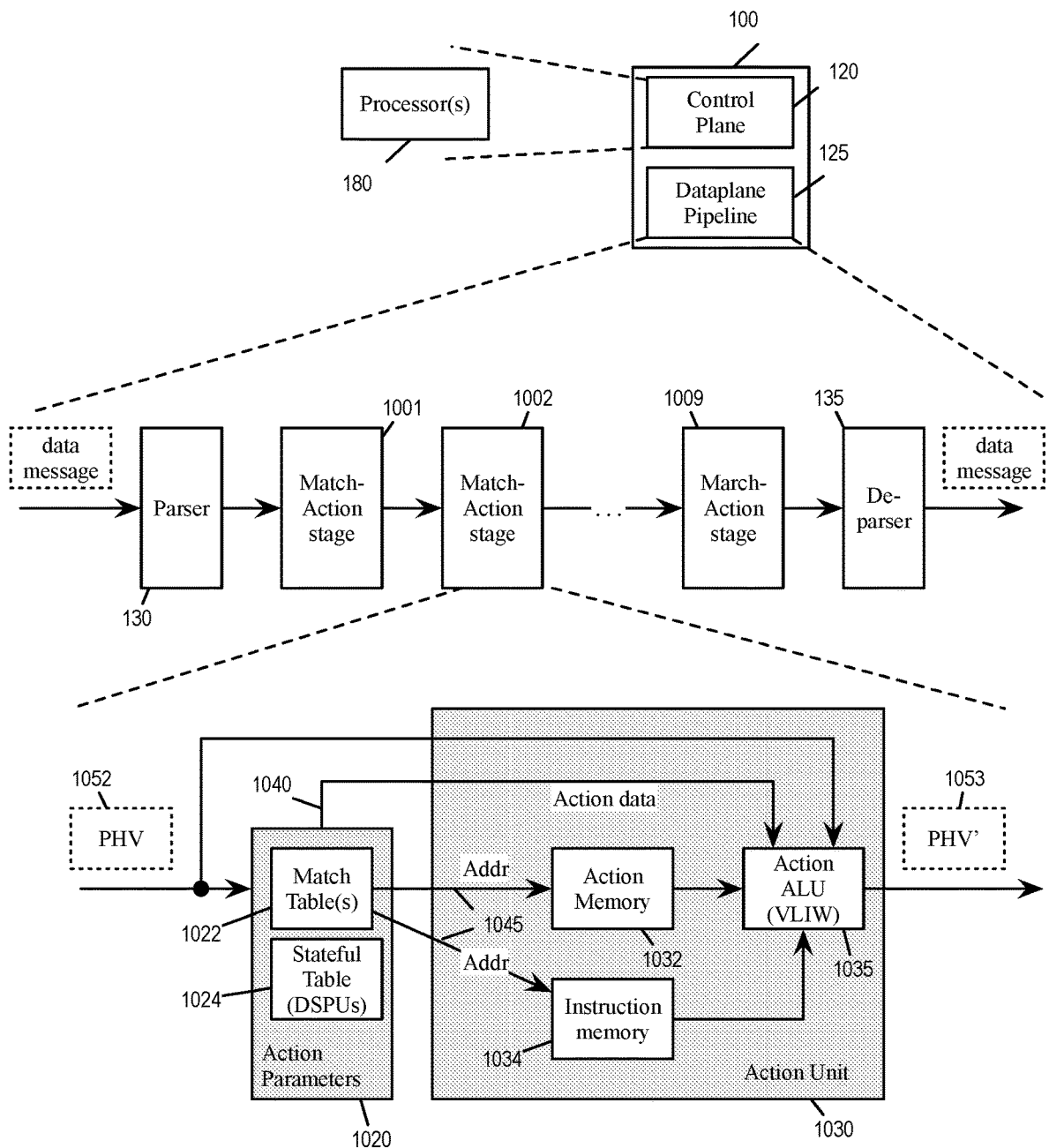
FIG. 10 illustrates a packet-processing pipeline that implements match-action packet processing pipeline that includes match-action stages with a set of DSPUs.

In some of these embodiments, the packet-processing pipeline includes a number of match-action stages, each of these match-action stages being a data processing stage that includes a set of data-plane stateful processing unit (DSPU). FIG. 10 illustrates a forwarding element 100 (similar to forwarding element 100 in FIG. 1) that implements match-action packet processing, where the pipeline includes match-action stages having DSPUs. As illustrated, the data plane pipeline 125 includes a parser 130, a series of match-action stages 1001-1009, and a deparser 135.

Each match-action stage (such as the stage 1002) includes an action parameters module 1020 and an action unit 1030. The action parameters module receives a PHV 1052 that comes from a previous stage (in this example the stage 1001) and produces an action data 1040 for the action unit 1030. The action parameters module 1020 also produces an address 1045 for the action unit 1030.

The action parameters module 1020 includes one or more match tables 1022 and a stateful table 1024. Each match table 1022 is for matching the incoming PHV 1052 against a set of rules and for indicating the result of the matching. Each match table stores a set of lookup keys that each corresponds to an action code. The stateful table 1024 is implemented by one or more DSPUs. The output of the stateful table 1024 and the output of the match tables 1022 together form the action data 1040 to the action unit 1030. The match tables 1022 also provide an address to the action unit 1030 that is used by the memory structures in the action unit.

The action unit 1030 includes an action memory 1032, an instruction memory 1034, and an action ALU 1035, which is a very large instruction word (VLIW) processor in some embodiments. The action ALU 1035 executes instructions from the instruction memory 1034 and performs actions described by the action memory 1032 as well as by the action data provided by the action parameters module 1020 (including outputs of both the match table 1022 and the stateful table 1024). In some embodiments, such output of the action unit/action ALU is for specifying actions such as transformation or routing that are to be taken with regard to the packet. The output of the action ALU forms a derivative PHV (PHV') 1053 for the next match-action stage. Consequently, the output of the DSPUs in the stateful table 1024 can be configured to become the PHV' output of the match-action stage 1002. In some embodiments, the derivative PHV includes unmodified data from the received PHV along with data that are modified by the data processing stage. In some embodiments, the derivative PHV includes metadata that are inserted by the data processing stage according to its programming.

In some scenarios, several match tables 1022 might result in matches that each point to a different address 1045 in the instruction memory 1034. An action dependency occurs when the instructions pointed to by these addresses set the same field in the PHV. Typically the compiler prevents such action dependencies and does not configure the pipeline in a way that these actions are performed in the same message processing stage.

However, as described below, the compiler in some embodiments allows actions that write to the same field to be performed in the same message processing stage when the actions are the same. For instance, when two or more actions are for writing to the same field to indicate that the data message being processed has to be dropped, the compiler allows these actions to occur in the stage as the actions are the same and result in writing the same data in the same PHV field.

Figure 11:
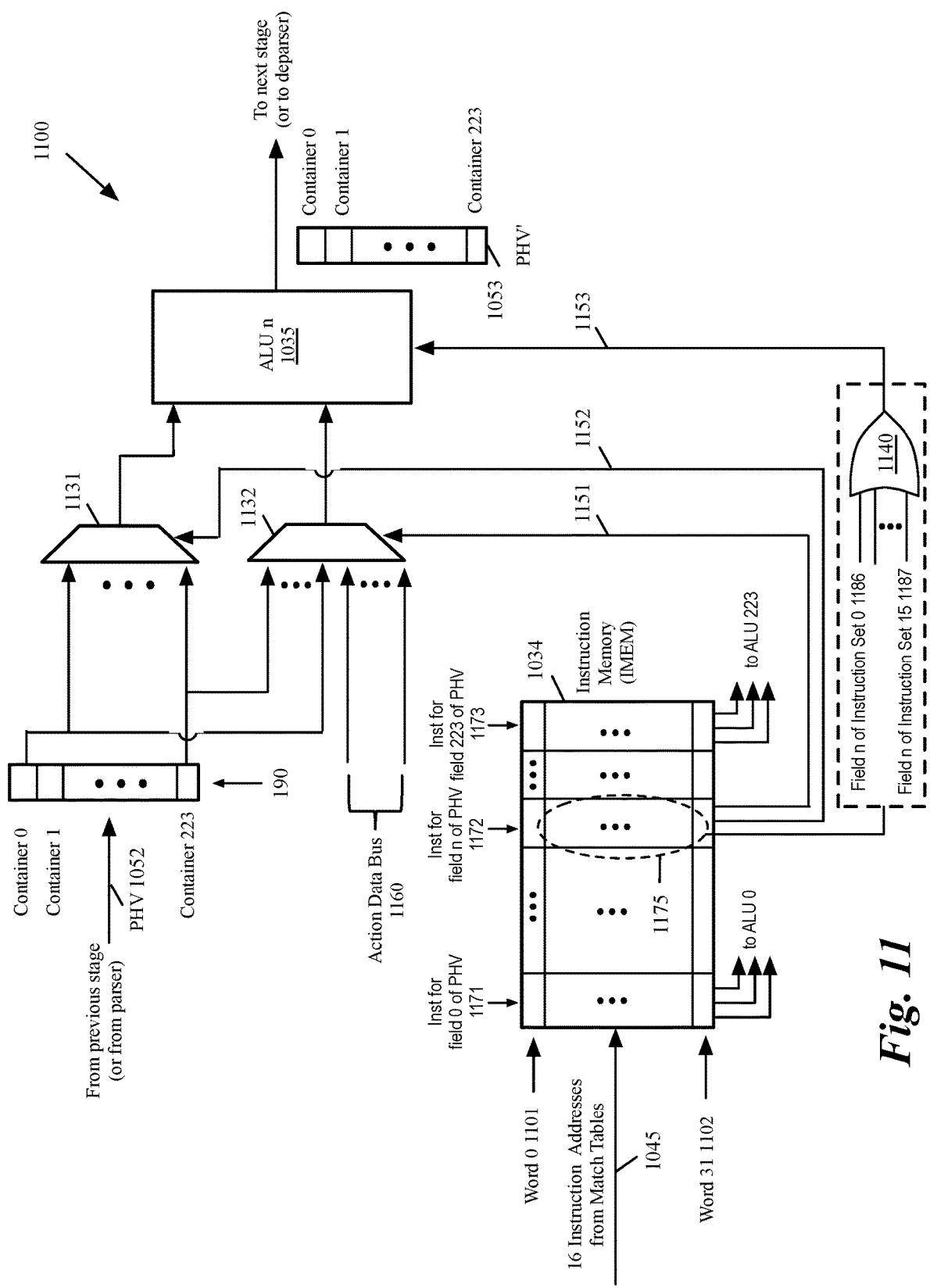
FIG. 11 conceptually illustrates several portions of the action unit of FIG. 10 in further detail.

FIG. 11 conceptually illustrates several portions of the action unit 1030 of FIG. 10 in further detail. As shown, the Action Unit 1100 includes the instruction memory 1034, action operand multiplexers 1131-1132, and an ALU 1035 for every PHV field. The action unit 1100, therefore, is capable of changing every PHV field in each clock cycle. For simplicity, the figure only shows the ALU 1035 for one of the PHV fields (in this example field n of the PHV).

Instruction memory (IMEM) 1034 includes several words (or entries) 1101-1102. Each word 1101-1102 includes one instruction 1171-1173 corresponding to each PHV fields. For example, when there are 224 PHV fields, then there are 224 instructions 0871-1173 (one per PHV field) in each word 1101-1102 of the instruction memory 1034. Each instruction is a variable length "op code" plus operands.

An action defines the set of PHV field transformations associated with a match table entry (e.g., a match table 1022 in FIG. 10), and may also specify meters, statistics counters, etc. For instance, if the match table is doing Internet protocol (IP) forwarding, then an action needs to decrement a time-to-live (TTL) field in the PHV, set the egress port number, specify the new destination media access control (MAC) address and indicate that the source MAC addresses must be updated on egress to be that of the egress port. As a result, a single match table might update many fields. In some embodiments, each MAU can have up to 16 match tables. In these embodiments, up to 16 actions could be produced per clock. Each action might specify an operation on multiple PHV fields. All of these actions are combined to happen at the same time.

In this example, the instruction memory 1034 has 32 words 1101-1102 and there are 16 instruction addresses 1045 from the match tables (e.g., match tables 1022 in FIG. 10). Therefore, up to 16 words from the 32 words 1101 are addressed per clock cycle. The instruction memory 1034 in some embodiments is a one read port memory, where the one read port output data 1153 represents the OR of 16 accesses (out of the possible 32 instructions 1175).

As conceptually shown, the 16 instructions (out of the 32 instructions 1172) that correspond to field "n" of the PHV are 16 instruction sets 1186-1187. The 16 instruction sets 1186-1187 are selected based on the 16 instructions addresses 1045 received from the match table in each clock cycle. These 16 instructions addresses 1045 are logical ORed together by the OR gate 1140 and the result is provided (as shown by 1153) to the ALU n 1035, which is used to operate on (or modify) field n of the PHV.

Typically each match table has very few types of Actions. For the IP forwarding example, there might only be two types of actions: either forward the data message (and make the field changes described above), or discard the packet if the current TTL is 1 and then update a drop counter. However, an action dependency occurs when two or more of the instruction addresses 1045 point to instructions 1171-1173 that modify the same field of the PHV (e.g., field n).

Instead of configuring the pipeline in a way that these actions are performed in different message processing stage, the compiler in some embodiments determines whether the instructions that modify the same PHV field are the same instructions (i.e., the instructions with the same op code and operands). In these cases, the fact that the 16 instructions that corresponds to the same field of the PHV (e.g., field n of the PHV) are logical ORed together by OR gate 1140 allows the compiler to configure the pipeline to perform these instructions in the same message processing stage and the same clock cycle. Therefore, the pipeline operates more efficiently by performing as many operations as possible in the same message processing pipeline and the same clock cycle.

As shown, ALU n 1035 (which operates on field n of the PHV) receives the ORed instruction addresses 1153 from the instruction memory 1034. The ALU also receives an input from multiplexer 1131 and another input from multiplexer 1132. Multiplexer 1131 receives the PHV 1052 from the previous stage (or from the parser if the current message processing stage is the first stage). The PHV is stored in PHV containers 190. The contents of one of the containers (in this example the container that stores field n of the PHV) are selected by the selection line 1152 received from the instruction memory 1034.

Multiplexer 1132 receives the PHV 1052 from the previous stage (or from the parser if the current message processing stage is the first stage) as well as data from the action data bus 1160. One of the inputs of multiplexer 1132 is selected and sent to ALU n 1035 by the selection line 1151 received from the instruction memory 1034.

Figure 12:
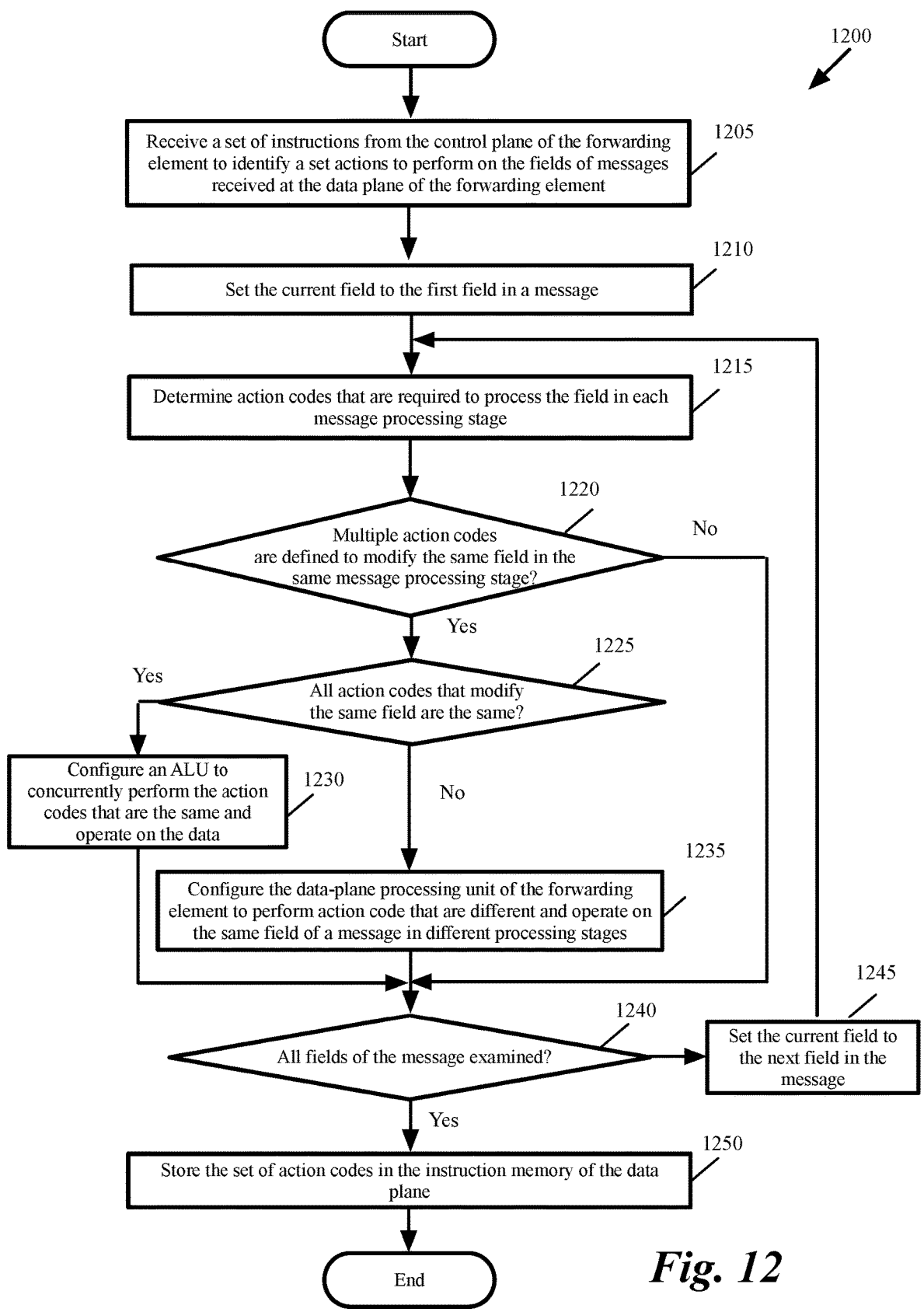
FIG. 12 conceptually illustrates a process for removing action dependencies in some embodiments.

FIG. 12 conceptually illustrates a process 1200 for removing action dependencies in some embodiments. The process in some embodiments is performed by a compiler such as compiler 400 in FIG. 4. As shown, the process receives (at 1205) a set of instructions from the control plane of the forwarding element to identify a set actions to perform on the fields of messages received at the data plane of the forwarding element. For instance, the process receives a set of P4 instructions by the code receiver 405 in FIG. 4.

The process then sets (at 1210) the current field to the first field of a message. The process then determines (at 1215) the action codes that are required to process the field in each message processing stage. For instance, the process uses the flow graph 430 (shown in FIG. 4) to determine the action codes that are required to process the field in each message processing stage.

The process then determines (at 1220) whether multiple action codes modify the same field in the same message processing stage. If not, the process proceeds to 1240, which is described below. Otherwise, the process determines (at 1225) whether all action codes that modify the same PHV field are the same. For instance, the process determines whether all action codes have the same op code and operands. If yes, the process configures (at 1230) an ALU to concurrently perform the action codes that are the same and operate on the data. For instance, the process configures ALU n 1035 in FIG. 11 to perform all action codes 1186-1186 in the same message processing stage and during the same clock cycle. The process then proceeds to 1240, which is described below.

Otherwise, the process configures (at 1235) an ALU to perform the action code that are different and operate on the same field of a message in different processing stages. The process then determines (at 1240) whether all fields of the message examined. If yes, the process stores (at 1250) the set of instructions in the instruction memory of the data plane. For instance, the process stores the instruction in instruction memory 1034 in FIG. 11. The process then ends. Otherwise, the process sets (at 1245) the current field to the next field in the message. The process then proceeds to 1215, which was described above.

It should be understood that process 1200 only describes a portion of the operations performed by a compiler such as compiler 400 during translation of a set of instructions that defines the switch operations in order to remove action dependencies in the instructions.

III. Computer System

Many of the above-described features and applications are implemented as software processes that are specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 13:
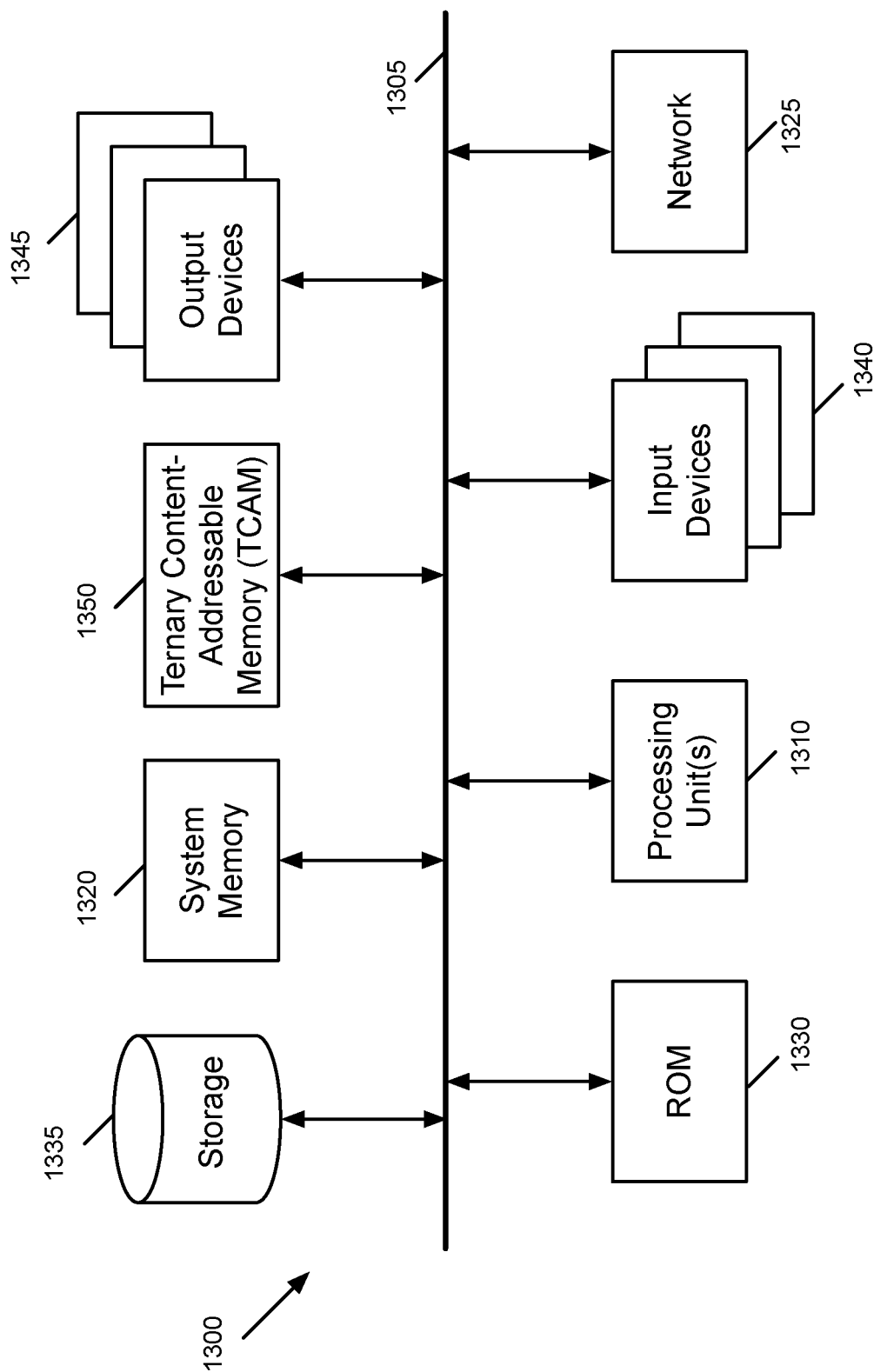
FIG. 13 conceptually illustrates an electronic system with which some embodiments of the invention are implemented.

FIG. 13 conceptually illustrates an electronic system 1300 with which some embodiments of the invention such as the forwarding elements, routers, switches, etc., are implemented. The electronic system 1300 can be used to execute any of the control, virtualization, or operating system applications described above. The electronic system 1300 may be a computer (e.g., desktop computer, personal computer, tablet computer, server computer, mainframe, blade computer etc.), phone, PDA, or any other sort of electronic device. Such an electronic system includes various types of computer readable media and interfaces for various other types of computer readable media. Electronic system 1300 includes a bus 1305, processing unit(s) 1310, system memory 1320, read-only memory (ROM) 1330, permanent storage device 1335, input devices 1340, output devices 1345, and ternary content-addressable memory (TCAM 1350).

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1330, the system memory 1320, and the permanent storage device 1335.

From these various memory units, the processing unit(s) 1310 retrieve instructions to execute and data to process in order to execute the processes of the invention. The processing unit(s) may be a single processor or a multi-core processor in different embodiments.

The read-only-memory 1330 stores static data and instructions that are needed by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the invention use a mass-storage device (such as a magnetic or optical disk and its corresponding disk drive) as the permanent storage device 1335.

Other embodiments use a removable storage device (such as a floppy disk, flash drive, etc.) as the permanent storage device. Like the permanent storage device 1335, the system memory 1320 is a read-and-write memory device. However, unlike storage device 1335, the system memory is a volatile read-and-write memory, such as random access memory. The system memory stores some of the instructions and data that the processor needs at runtime. In some embodiments, the invention's processes are stored in the system memory 1320, the permanent storage device 1335, and/or the read-only memory 1330. From these various memory units, the processing unit(s) 1310 retrieve instructions to execute and data to process in order to execute the processes of some embodiments.

The bus 1305 also connects to the input and output devices 1340 and 1345. The input devices enable the user to communicate information and select commands to the electronic system. The input devices 1340 include alphanumeric keyboards and pointing devices (also called "cursor control devices"). The output devices 1345 display images generated by the electronic system. The output devices include printers and display devices, such as cathode ray tubes (CRT) or liquid crystal displays (LCD). Some embodiments include devices, such as a touchscreen, that function as both input and output devices.

Finally, as shown in FIG. 13, bus 1305 also couples electronic system 1300 to a network 1325 through a network adapter (not shown). In this manner, the computer can be a part of a network of computers (such as a local area network ("LAN"), a wide area network ("WAN"), an Intranet, or a network of networks, such as the Internet). Any or all components of electronic system 1300 may be used in conjunction with the invention.

Some embodiments include electronic components, such as microprocessors, storage, and memory, that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

In view of the foregoing, one of ordinary skill in the art would understand that the invention is not to be limited by the foregoing illustrative details, but rather is to be defined by the appended claims.

What is claimed is:

1. A method for determining a configuration for a data plane message processing pipeline of a hardware forwarding element comprising a plurality of message processing stages, the method comprising:

identifying a set of message processing instructions for the data plane message processing pipeline to execute on data messages received by the hardware forwarding element, the set of message processing instructions comprising action codes to be stored in instruction memories of the message processing stages, the action codes specifying actions for the message processing stages to perform on data message fields of the data messages;

determining that the set of message processing instructions specifies that a plurality of action codes for a particular data message field are to be stored in the instruction memory of a particular message processing stage; and when the plurality of action codes specify different actions for the particular message processing stage to perform on the particular data message field, specifying that a subset of the plurality of the action codes are to be stored in the instruction memories of different message processing stages.

2. The method of claim 1, wherein the particular data message field is a first data message field and the plurality of action codes is a first plurality of action codes, the method further comprising:

determining that the set of message processing instructions specifies that a second plurality of action codes for a second data message field are to be stored in the instruction memory of the particular message processing stage; and when the second plurality of action codes all specify the same action for the particular message processing stage to perform on the second data message field, allowing the second plurality of action codes to be stored in the instruction memories of the particular message processing stage.

3. The method of claim 1, wherein the particular message processing stage comprises circuitry to perform a logical OR operation on action codes read from the instruction memory of the particular message processing stage for the particular data message field.

4. The method of claim 3, wherein for a particular data message, a plurality of sets of action codes are read from the instruction memories of the particular message processing stage, wherein each set of action codes comprises action codes for each of a set of data message header fields.

5. The method of claim 1, wherein the particular message processing stage comprises a set of data plane processing circuits that execute the action codes stored in the instruction memories of the particular message processing stage.

6. The method of claim 5, wherein each of the data plane processing circuits is configured to execute action codes for a different data message field.

7. The method of claim 5, wherein the data plane processing circuits are arithmetic logic units (ALUs).

8. The method of claim 1, wherein the set of instructions is specified in a data plane programming language.

9. The method of claim 8, wherein the data plane programming language is P4.

10. The method of claim 1, wherein the particular message processing stage is a first message processing stage and the plurality of action codes is a first plurality of action codes, the method further comprising:

determining that the set of message processing instructions specifies that a second plurality of action codes for the particular data message field are to be stored in the instruction memory of a second message processing stage; and when the second plurality of action codes all specify the same action for the second message processing stage to perform on the particular data message field, allowing the second plurality of action codes to be stored in the instruction memories of the second message processing stage.

11. The method of claim 1, wherein the particular message processing stage is a first message processing stage and the plurality of action codes is a first plurality of action codes, the method further comprising:
determining that the set of message processing instructions specifies that a second plurality of action codes for the particular data message field are to be stored in the instruction memory of a second message processing stage; and
when the second plurality of action codes specify different actions for the second message processing stage to perform on the particular data message field, specifying that a subset of the second plurality of action codes are to be stored in the instruction memories of different message processing stages.

12. The method of claim 1, wherein data messages received by the hardware forwarding element are processed by the plurality of message processing stages of the data plane message processing pipeline.

13. The method of claim 1, wherein the data plane message processing pipeline further comprises a parser and a deparser.

14. The method of claim 13, wherein the parser receives a data message and parses the data message to store data message header field values in data containers of a packet header vector that are passed to the message processing stages.

15. The method of claim 14, wherein the message processing stages perform actions on data message fields of the data messages by modifying values stored in the data containers of the packet header vector.

16. The method of claim 14, wherein the deparser receives the packet header vector modified by the message processing stages and reconstitutes a modified data message.

17. The method of claim 1 further comprising determining whether the set of message processing instructions specifies that a plurality of different action codes for the particular data message field are to be stored in the instruction memory for each of the message processing stages.

18. The method of claim 1 further comprising determining whether the set of message processing instructions specifies that a plurality of different action codes for each of a plurality of different data message fields are to be stored in the instruction memory for the particular message processing stage.

19. The method of claim 1 further comprising determining whether the set of message processing instructions specifies that a plurality of different action codes for each of a plurality of different data message fields are to be stored in the instruction memory for each of the message processing stages.

* * * * *